United States Patent [19]
Conlin

[11] Patent Number: 6,082,290
[45] Date of Patent: Jul. 4, 2000

[54] PAINT SPRAY BOOTH WITH ROBOT

[76] Inventor: Douglas Conlin, 737 Ambleside Dr., Wilmington, Del. 19808

[21] Appl. No.: 09/100,534

[22] Filed: Jun. 19, 1998

Related U.S. Application Data

[60] Provisional application No. 60/058,846, Sep. 15, 1997.

[51] Int. Cl.[7] .................................................. B65D 65/02
[52] U.S. Cl. ........................... 118/326; 150/154; 901/49; 403/293; 403/341
[58] Field of Search ............................... 118/326, DIG. 7; 150/161, 154; 901/49; 403/293, 292, 315, 338, 341

[56] References Cited

U.S. PATENT DOCUMENTS

| | | |
|---|---|---|
| 3,921,576 | 11/1975 | Vertue . |
| 4,484,772 | 11/1984 | Ross, Sr. et al. ...................... 285/226 |
| 4,630,567 | 12/1986 | Bambousek et al. .................. 118/323 |
| 4,762,455 | 8/1988 | Coughlan et al. ......................... 424/4 |
| 5,025,836 | 6/1991 | Botsolas ................................. 138/110 |
| 5,769,703 | 6/1998 | Conlin ..................................... 454/50 |

*Primary Examiner*—Shrive Beck
*Assistant Examiner*—Jennifer Calcagni
*Attorney, Agent, or Firm*—Connolly Bove Lodge & Hutz

[57] ABSTRACT

A paint spray booth includes a robot having a cover member assembly at its wrist joint. The cover members interlock at the robot's axes to seal out paint while allowing a full range of motion. The cover members are made of semi-rigid material. Protective curtains may be detachably mounted to the walls of the booth.

20 Claims, 2 Drawing Sheets

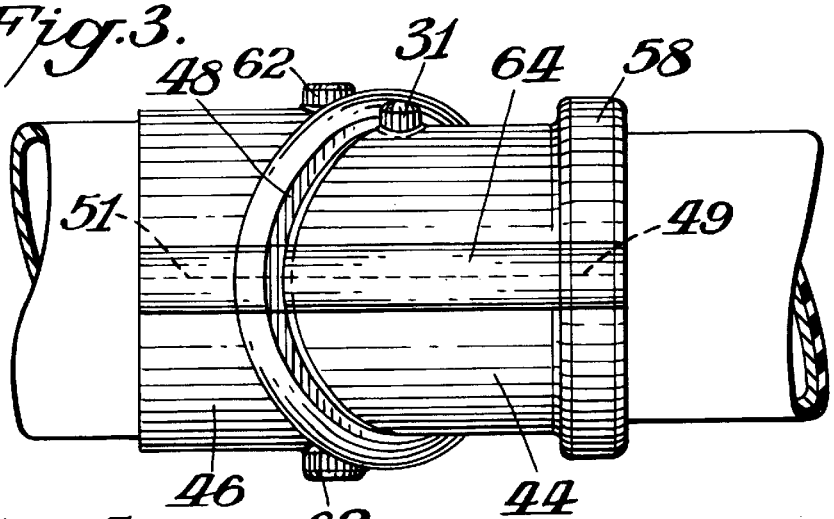
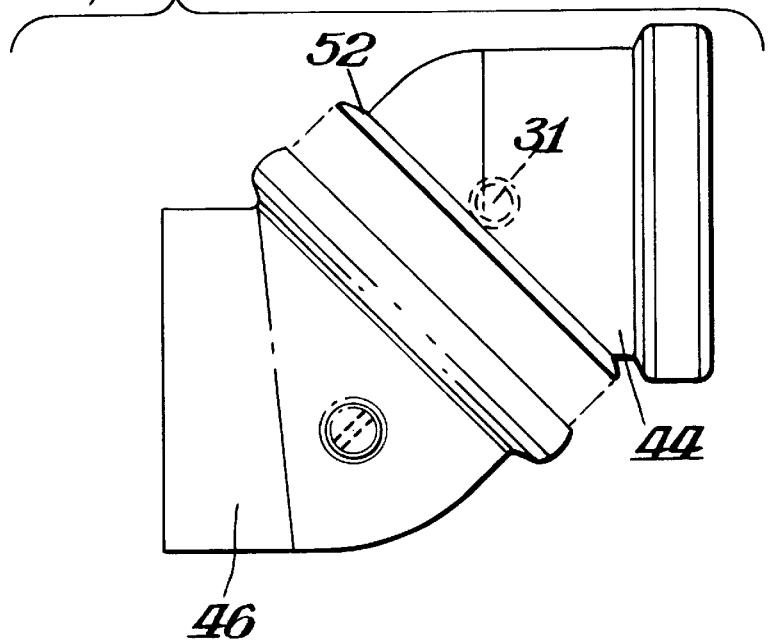
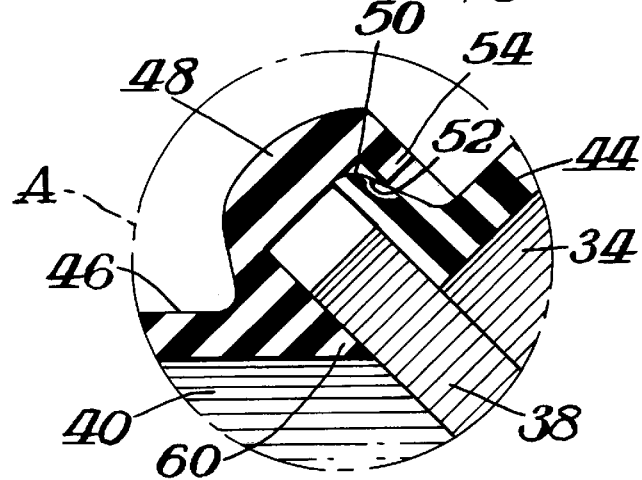

PAINT SPRAY BOOTH WITH ROBOT

CROSS-REFERENCE TO RELATED APPLICATION

This application is based upon provisional application Ser. No. 60/058,846, filed Sep. 15, 1997.

BACKGROUND OF THE INVENTION

The present invention relates to paint spray booths and particularly to paint spray booths having robots.

Paint spray booths are used for painting various objects. A common use of such type of booth is in the automotive industry. Frequently, such booths incorporate robots as a means for applying the paint. Because the paint becomes airborne, the paint is deposited on various parts of the robot such as the wrist joint and the compressed air delivery hose. This presents a problem in particular with regard to the joint or wrist connecting the spray nozzle or gun to the robot arm. For example, at such location the movement takes place about different axes. When dry paint has accumulated on the robot, robot movement causes the dry paint to shed. The dry paint contaminates the object being painted. A further problem is that the paint mist can get into the joint at each axis and dry. When the robot twists, particles of paint are dropped.

A prior art attempt at addressing the above problem involves providing loose cloth shrouds over the two interlocking parts which form the robot wrist. While this arrangement seals each axis, it still has the problem of shedding dry paint. A further disadvantage of cloth covers is that the covers can not be cleaned. Additionally, such cloth gives off lint.

A further problem in such paint booths is the accumulation of paint on the walls of the booth. If measures are not taken, such problem results in the requirement to spend time in cleaning the walls.

SUMMARY OF THE INVENTION

An object of this invention is to provide a paint spray booth with protective members to address the above indicated problem.

A further object of this invention is to provide semirigid covers from axis to covering the entire robot.

A further object of this invention is to provide a protective covering for a robot in the booth.

A still further object of this invention is to provide such a protective covering which is located at the wrist of the nozzle arm and robot arm.

A still further object of this invention is to provide a detachable covering for the walls of the booth.

In accordance with one aspect of this invention a semi-rigid cover of multi-piece construction is located at the robot wrist joint. The cover includes connecting structure on adjacent cover members to interlock the cover members, yet permit relative rotation of one cover member with respect to the other. Thus, the joint is protected without impeding the rotational movement of the arm. The semi-rigid material is preferably made of a non-porous plastic such as PVC which lends itself to numerous desirable characteristics for such a cover.

In accordance with a further feature of this invention a protective curtain is detachably mounted to at least one of the walls of the booth to readily permit a fresh curtain to replace a previously used curtain. In the preferred practice of this aspect of the invention, the detachable fastening members are provided only along the periphery of the curtain thereby leaving the central portion unsecured. This facilitates a quick mounting and removal of the cover or curtain while effectively preventing air flow from blowing the curtain away from the wall.

THE DRAWINGS

FIG. 3 is a top plan view of the wrist joint shown in FIG. 2;

FIG. 4 is an exploded side elevational view showing the assembly of the wrist joint cover component of FIGS. 2–3; and FIG. 5 is an enlarged cross-sectional view of the portion of FIG. 2 designated by the letter A.

DETAILED DESCRIPTION

The present invention is directed to improvements in paint spray booths and is intended to be adapted for use in any type of paint spray booth. Thus, the details of the booth itself are not novel but set forth the preferred environment for use of the invention. Since such booth structure is known in the art, a detailed description of the booth structure is not necessary. Reference is made to U.S. Pat. Nos. 4,207,833, 4,231,289, 4,469,595, 4,484,513, 4,693,048, 5,201,954, 5,236,504, and 5,240,504 for exemplary paint booth structure. The details of those patents are incorporated herein by reference thereto.

Figure 1:
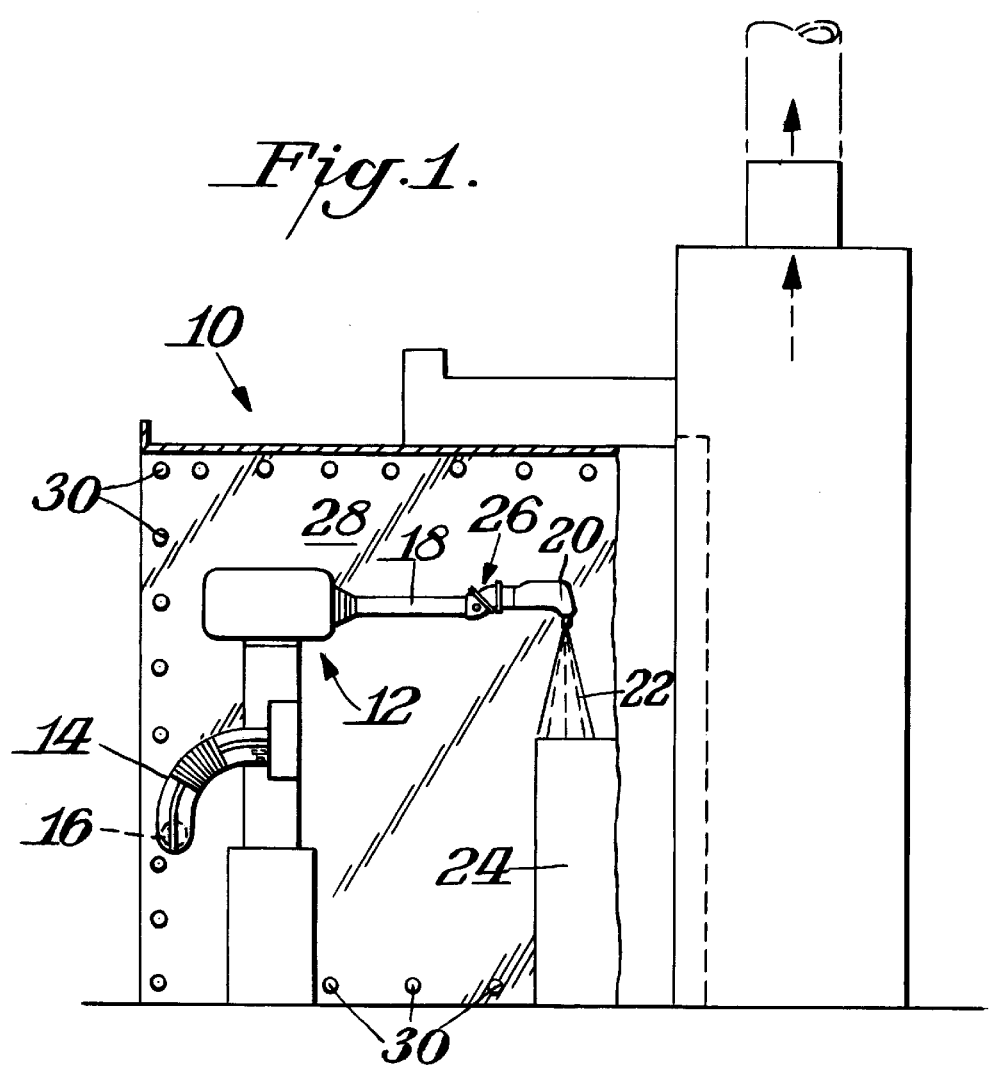
FIG. 1 is a side elevational view of a paint spray booth party broken away in accordance with this invention.

FIG. 1 illustrates a paint spray booth 10 which may incorporate the present invention. As shown therein the paint spray booth 10 is provided with a conventional robot 12. Robot 12 includes a paint delivery hose 14 which extends through an opening 16 in the side wall of booth 10. Additionally, robot 12 includes a robot arm 18 having a spray nozzle or gun 20 at its outer end. Nozzle 20 applies a paint spray pattern 22 on the object 24 being painted. The spray nozzle 20 is connected to arm 18 by a wrist joint 26 which is shown in greater detail in FIGS. 2–4.

In accordance with one aspect of the invention, one or more of the walls of booth 10 is provided with a detachable protective curtain or barrier 28. Protective curtain 28 is detachably secured to its wall at the periphery of one or more of and preferably all four sides by means of any suitable fasteners 30. The central area of each curtain 28, however, is left unsecured. This provides for a quick mounting and removal of the curtain 28 when it is desired to remove an old curtain and replace it with a new curtain. This manner of fastening also effectively prevents air flow from blowing the curtain away from the wall particularly by having all four sides of curtain 28 secured.

Curtain 28 may take any suitable form and may be attached in any suitable manner. Reference is made to co-pending application Ser. No. 08/764,993 filed Dec. 16, 1996, now U.S. Pat. No. 5,769,703, all of the details of which are incorporated herein by reference thereto. As pointed out therein, curtain 28 may be made of any suitable material such as being an adsorbent material made of PFP foam with a liquid impermeable barrier layer made, for example, from polyethylene. A particularly advantageous material is TEFLON® or PTFE to take advantage of the non-sticking characteristics as well as the fire proof characteristics of such material.

In one aspect of the invention a TEFLON® coating or other suitable material such as KAPTON (polyimide) or PFP which is knitted polyester cloth impermeable to liquids may be applied to the wall itself without an additional protective curtain. By using such material on the wall or the curtain the paint will tend to slide off or be easily washed off the exposed surface. Where a curtain itself is used made of material such as TEFLON® the curtain could last indefinitely by being readily cleaned where necessary in cases where there has been some adherence of the paint to the curtain since the paint could easily be removed from the curtain.

Preferably, curtain 28 is made of a fireproof or nonflammable material or a material having self-extinguishing flammability characteristics. Thus curtain 28 is preferably made of some form of fire retarding or fire-proof material.

Any suitable fasteners 30 may be used for detachably securing curtain 28 to its wall of booth 10. Examples of such fasteners include pressure sensitive adhesive, hooks, looping the top of the curtain and hanging it from a curtain rod, covering the walls with adhesive and in turn covering with the curtain with adhesive strips, magnets, snaps, adhesive tape, VELCRO, spring clips, strings, nylon ties, twist ties, air pressure, suction, and static electricity.

As can be appreciated the present invention overcomes problems that have long plagued the prior art. In this regard, for years the overspray of paint in a spray booth has caused concern for automotive manufacturers without any real alternative solution. By providing a suitable curtain mounting arrangement, such as VELCRO or snap fasteners or the various other mounting means noted above, around the perimeter of the walls with complementary fastening members affixed to the curtain, it is possible to provide sheets of plastic material (which may be transparent) acting as shields for the walls. This concept can be accomplished by cutting the sheets or curtains to fit any installation and can be cut to accommodate doors, shelves, hoses or virtually anything within the paint spray booth while allowing visual reference to the paint booth operation. The invention is easy to use, cost effective and environmentally friendly. With the present invention, when there has been a sufficient paint residue accumulated on the curtain, the curtain is simply removed and readily replaced by a new curtain without any toxic material causing danger to the environment.

In accordance with another aspect of this invention protective covering is also provided for the robot 12. Such protective covering may be located along all or various parts of the robot such as over the paint delivery hose 14 and over the arm 18 and nozzle 20. In particular, however, the invention advantageously includes covering members over the wrist joint 26.

FIGS. 2–5 illustrate the wrist joint 26 in greater detail. As shown therein the spray nozzle is mounted on arm 32 forms part of the wrist joint and is connected to the robot arm 18. The central axis of arm 32 which is attached to the spray gun or spray nozzle forms one axis of rotation of the joint 26 with regard to co-axial joint member 34. Robot arm 18 has its central axis as an axis of rotation with respect to coaxial joint member 40. As illustrated each joint member 34,40 has a bend and is thus elbow shaped. The two joint members 34,40 in turn may rotate with respect to each other by means of bearing race 38. The joint 26 may also rotate around each arm 18,32 by means of bearing races 36,37. The relative movement of arms 32 and 18 about their axes through use of the wrist joint 26 is of known construction. The location where the various parts fit together are locations which create problems due to the mist getting into the joint of axis rotations.

In accordance with this invention a multi-part cover assembly is provided at the joint 26 to cover the locations where arms 18 and 32 are mounted to the joint 26 and to cover the joint itself at each axis of rotation.

The cover assembly comprises a nozzle arm cover member 44 and a robot arm cover member 46. As later described each of these members is made of a material which is particularly advantageous for use in the spray booth.

As later described, each of the cover members has a longitudinal slit 49,51 to permit the cover members 44,46 to be spread apart for being mounted over their respective joint member 34,40. As shown in FIG. 5 the cover members are also interlocked or mounted to each other to permit relative rotational movement. For example, robot arm cover member 46 includes a U-shaped peripheral protrusion 48 having a channel 50 which receives the peripheral flange or lip 52 of cover member 44 leaving room for the bearing race 38. The overlap of the leg 54 of protrusion 48 and lip 52 provides an effective shield completely around the joint between joint members 34 and 40.

Figure 2:
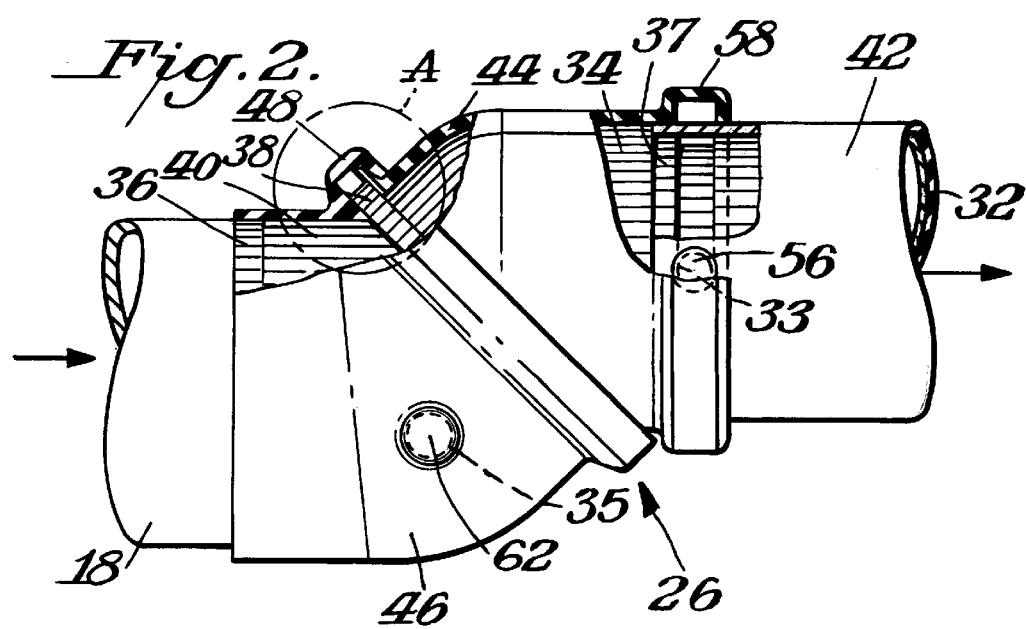
FIG. 2 is a side elevational view party broken away and in section showing the wrist joint of a robot in the booth of FIG. 1.

As shown in FIG. 2 a generally cylindrical protective sleeve 42 is slid onto gun or nozzle arm 32. Sleeve 42 extends directly over bearing 37 to thereby shield the bearing. Joint 26 includes conventional outwardly extending screws 31,33,35. Sleeve 42 includes a hollow protuberance 56 which fits over screw 31. Protective sleeve or cover 44 is fit over wrist joint member 34 and over cover or sleeve 42.

Because wrist joint member 34 is not of pure cylindrical shape, as is arm 32, it is necessary to provide a particular manner of securing cover 44 around wrist joint member 34. This is easily accomplished by having the longitudinal slit 49 extend completely across member 44 thereby permitting the semi-rigid member 44 to be spread apart and mounted in place. As best shown in FIG. 2 cover member 44 includes a peripheral outwardly extending U-shaped channel 58 at its outer end which fits over the end of sleeve 42 and accommodates screw 33 and the screw accommodating protuberance 56 of sleeve 42. In this manner, race 37 is completely shielded and thereby sealed against the entry of foreign objects, such as paint spray.

As best shown in FIG. 5 cover member 44 and cover member 46 have structure to accommodate the eccentric race 38 where wrist joint members 34 and 40 meet. Specifically, in the illustrated embodiment cover member 44 terminates in an eccentric tapered lip 52 which is disposed toward and parallel to race 38. Cover member 46 includes an outwardly extending channel 48 which fits over race 38 and over lip 52. As illustrated in FIG. 5 the terminal edge or leg 54 of channel 48 fits against flange or lip 52 which is disposed within the channel 50 of extension 48. The lower portion of extension 48 has a generally V-shaped extension 60 which has an outer surface parallel to the outer surface of flange 52 and parallel to race 38. In this manner, race 38 is enveloped by the overlapping interlocking relationship at the ends of cover members 44 and 46.

As also shown in FIG. 2 cover member 46 extends a sufficient distance to overlap race 36 thereby shielding that race. As with cover member 44 the cover member 46 also has a longitudinal slit 51 to facilitate the cover member 44 being spread apart and being mounted in place. Similarly, cover member 46 includes protuberances 62 which fit over outwardly extending screws 35.

As shown in FIG. 3 the slits 49,51 of cover members 44,46 are covered in any suitable manner and in the illustrated embodiment are covered by tape 64. Any suitable tape may be used. In a preferred practice of this invention the tape 64 is a solvent resistant tape to withstand conditions in a paint spray booth. Commercially available tape 3M(#222) is suitable.

As illustrated, in particular in FIGS. 2–4, the cover members 44,46 have a smooth continuous outer surface except for the portions of the cover members which include protuberances to accommodate fasteners on the robot, the bearing races of the robot and the overlapping structure with respect to adjacent cover members. Thus, as illustrated the cover members are of non-bellows form without any repetitive pattern of hills and valleys.

Thus, in the preferred practice of this invention, the paint spray booth includes a robot which has its wrist or joint covered by the two piece assembly of cover members 44,46. Preferably, a third piece, sleeve 42 is also provided. Other portions of the robot may likewise be covered with suitable removable covers such as the hose 14. Where the portions of the robot are of cylindrical or uniform shape any suitable cover member may be used which may vary from being completely flexible to being completely rigid. At the wrist, however, the invention is preferably practiced where the cover members are made of semi-rigid material. The term semi-rigid is used to mean a material which permits the members to be spread apart thus facilitating their mounting on the irregularly shaped joint, yet, having sufficient rigidity to hold their own shape. The preferred semi-rigid material is PVC which preferably is dip molded, rather than injection molded. The PVC can vary in resistivity since it is preferred that a completely resistive material not be used in a paint spray booth. Other materials may also be used such as various injection molded plastics or even rubber where the materials are semi-rigid. The material is preferably non-porous. It is preferred that the material should not contain silicon since silicon is a paint contaminant. It is also preferred that the material be self-flame extinguishing to minimize any danger from fires.

The cover members preferably have a hardness of 40–95 Shore A durometer with a tensile strength up to 2500 psi and a tear strength up to 450 psi. The material preferably has an elongation up to 350% and is heat resistant up to 105° C. with low temperature flexing down to −40° F. The material preferably has a di-electric strength up to 600 volts/mil and is chemically resistant to acid, salts and alkalies.

The invention provides a number of distinct advantages. For example, the cover members at the wrist joint provide a more precise fit and are easy and quick to install and remove. The materials for the cover members can be conductive or insulative and should resist overspray reaction to the robot. The degree of rigidity allows the cover members to overlap and interlock so as to form seals around the various axes of rotation of the robot while keeping out contaminants. Unlike cloth covers, the preferred material for the cover members contains no fibers which can shed to cause contamination. A further advantage with the cover members for the wrist joint is that they are more economical because their production could be automated as compared to conventional cloth covers which are sewn together. The semi-rigid nature of the cover members avoid flapping or flexing when the cover moves which would otherwise shake loose contaminants. Additionally, the semi-rigid member permits the cover members to be perforated and inflated thus expelling compressed air to repel overspray and last longer than conventional covers. A further advantage is that the cover members can be washed by hand while on the robot rather than requiring their removal and sending these covers to a launderer as with conventional cloth covers.

The cover members thus provide an assembly that is molded to closely fit the robot allowing the cover members to interlock around the robot axis while sealing out paint and allowing a full range of motion.

Although the invention has been particularly described with respect to paint spray booths, the invention may be practiced with other devices particularly with regard to providing cover members which shield a moveable joint to prevent contamination from entering the joint.

What is claimed is:

1. A combination robot and cover assembly comprising a robot having a plurality of spaced sets of adjacent members, said adjacent members in each set being connected together by a joint which permits said adjacent members to rotate with respect to each other, a cover assembly snugly mounted over and around said joint for at least one of a plurality of said sets of adjacent members, each cover assembly including at least two cover members made of shape retaining material having a stiffness of being at least semi-rigid and being of a form having a fixed non-variable length which maintains its shape in both the length and cross-sectional directions, and said cover members being interlocked to form a seal around said joint while permitting said adjacent members to rotate.

2. The combination of claim 1 wherein said cover members are made of non-porous material.

3. The combination of claim 1 wherein said cover members are molded of semi-rigid material.

4. The combination of claim 1 wherein said robot includes outwardly extending fasteners, said cover members include protuberances mounted over said fasteners, and said protuberances having a shape corresponding in shape to said fasteners.

5. The combination of claim 1 wherein said cover members have an outer surface which is smooth except for any protuberances to accommodate fasteners and bearing races of said robot and to provide overlapping structure with respect to adjacent cover members.

6. The combination of claim 5 wherein said robot includes outwardly extending fasteners, said cover members include protuberances mounted over said fasteners, and said protuberances having a shape corresponding in shape to said fasteners.

7. The combination of claim 1 wherein each of said cover members has a longitudinal slit to facilitate the mounting and detachment of said cover members on said robot.

8. The combination of claim 1 wherein said robot is housed in a paint spray booth having a plurality of walls and having a robot for applying paint, the improvement being in that at least one of said walls includes a curtain detachably mounted to said wall by fastening elements located along the periphery of said curtain, the central portion of said curtain being free of attachment to said wall, and wherein said robot comprises an arm and a spray nozzle connected together by said joint.

9. The combination of claim 8 wherein said curtain is made of fire resistant material.

10. The combination of claim 1 wherein said cover members comprise a first cover member and a second cover member, said first cover member having an elbow shape with a first one end concentric about its longitudinal axis with a second end at an angle to its longitudinal axis, said second cover member having an elbow shape with a first end concentric to its longitudinal axis and a second end at an angle to its longitudinal axis, and second end of said first cover member and said second end of said second cover member being in overlapping relationship to shield an angled race located at the junction of the first joint member and second joint member.

11. The combination of claim 10 wherein said second end of said first member terminates an outwardly extending lip, said second end of said second member terminating in a U-shaped peripheral extension which includes a downwardly extending wall disposed over said lip to interlock said first cover member and said second cover member.

12. The combination of claim 10 wherein said first end of said first cover member terminates in an outwardly extending peripheral channel.

13. The combination of claim 12 including a sleeve telescoped into said first end of said first cover member under said peripheral channel.

14. The combination of claim 13 wherein each of said first cover member and said second cover member includes at least one protuberance for accommodating a member extending outwardly from the first and second joint members.

15. The combination of claim 10 wherein said robot has an arm, said robot having a spray nozzle, and said spray nozzle being connected to said arm by said adjacent members of said joint.

16. The combination of claim 15 wherein said robot has a delivery hose, and a protective sleeve detachably mounted around said delivery hose.

17. The combination of claim 15 in further combination with a paint spray booth having said robot therein, and said paint spray booth having a protective curtain detachably mounted to at least one of its walls.

18. The combination of claim 17 wherein said curtain is mounted to said wall by fastening members along its periphery with the central portion of said curtain being unsecured to said wall.

19. The combination of claim 10 wherein each of said cover members has a longitudinal slit to facilitate the mounting and detachment of said cover members on a robot.

20. The combination of claim 10 wherein each of said cover members has an outer surface which is smooth except for any protuberances to accommodate fasteners and bearing races of a robot and to provide overlapping structure with respect to adjacent cover members.

* * * * *